US011919055B2

(12) United States Patent
Feldmann et al.

(10) Patent No.: US 11,919,055 B2
(45) Date of Patent: Mar. 5, 2024

(54) AIR RINSING APPARATUS AND SYSTEMS FOR RINSING CONTAINERS

(71) Applicant: Illinois Tool Works Inc., Glenview, IL (US)

(72) Inventors: William Mark Feldmann, Cincinnati, OH (US); William Rick Immell, Liberty Township, OH (US); Stanley Coley, Cincinnati, OH (US); Barbara Stefl, Lebanon, OH (US); James Steven Prows, Cincinnati, OH (US)

(73) Assignee: Illinois Tool Works Inc., Glenview, IL (US)

( * ) Notice: Subject to any disclaimer, the term of this patent is extended or adjusted under 35 U.S.C. 154(b) by 1189 days.

(21) Appl. No.: 16/432,249

(22) Filed: Jun. 5, 2019

(65) Prior Publication Data

US 2019/0366397 A1 Dec. 5, 2019

Related U.S. Application Data

(60) Provisional application No. 62/680,796, filed on Jun. 5, 2018.

(51) Int. Cl.
*B08B 9/28* (2006.01)
*A47L 5/38* (2006.01)
(Continued)

(52) U.S. Cl.
CPC ................ *B08B 9/286* (2013.01); *A47L 5/38* (2013.01); *B08B 5/023* (2013.01); *B08B 5/043* (2013.01); *B08B 9/30* (2013.01); *B08B 2209/08* (2013.01)

(58) Field of Classification Search
CPC ....... A47L 5/38; B08B 2209/08; B08B 5/023; B08B 5/043; B08B 9/286; B08B 9/30
See application file for complete search history.

(56) References Cited

U.S. PATENT DOCUMENTS 4,955,599 A 9/1990 Bersonnet
5,241,758 A * 9/1993 Cruz ........................ B08B 17/02 34/107
(Continued)

FOREIGN PATENT DOCUMENTS

CN 203842900 9/2014
CN 204974602 1/2016
(Continued)

OTHER PUBLICATIONS

Machine translation of JP2003-203745A (Year: 2003).*
(Continued)

*Primary Examiner* — Douglas Lee
(74) *Attorney, Agent, or Firm* — McAndrews, Held & Malloy, Ltd.

(57) ABSTRACT

Air rinsing apparatus and systems for rinsing containers are disclosed. An example air rinsing apparatus includes: a first enclosure having a first inlet port and a first output port; a second enclosure within the first enclosure, the second enclosure comprising a second inlet port and a second output port, the second output port disposed on a same face of the first enclosure as the first inlet port; and one or more air movers configured to: urge first air into the second inlet port, the second enclosure configured to direct the first air from the second inlet port to the second output port; and pull second air from the first output port, the first enclosure configured to direct the second air from the first inlet port to the first output port.

17 Claims, 6 Drawing Sheets

(51) Int. Cl.

| | |
|---|---|
| ***B08B 5/02*** | (2006.01) |
| ***B08B 5/04*** | (2006.01) |
| ***B08B 9/30*** | (2006.01) |

(56) References Cited

U.S. PATENT DOCUMENTS

| | | | | |
|---|---|---|---|---|
| 6,251,171 | B1 * | 6/2001 | Marra | B03C 3/12 96/96 |
| 7,806,952 | B2 * | 10/2010 | Fox | A61L 9/22 313/313 |
| 8,038,775 | B2 | 10/2011 | Gefter | |
| 8,074,372 | B2 | 12/2011 | Pucciani | |
| 8,382,013 | B2 | 2/2013 | Pucciani | |
| 8,444,188 | B2 | 5/2013 | Pucciani | |
| 8,707,989 | B2 | 4/2014 | Pucciani | |
| 8,920,224 | B2 | 12/2014 | Pucciani | |
| 8,960,572 | B2 | 2/2015 | Pucciani | |
| 9,293,895 | B2 | 3/2016 | Pucciani | |
| 9,309,060 | B2 | 4/2016 | Pucciani | |
| 9,592,968 | B2 | 3/2017 | Pucciani | |
| 2008/0113598 | A1 | 5/2008 | Pucciani | |
| 2008/0276485 | A1 | 11/2008 | Pucciani | |
| 2010/0117356 | A1 | 5/2010 | Pucciani | |
| 2010/0120350 | A1 | 5/2010 | Pucciani | |
| 2010/0128408 | A1 | 5/2010 | Takayanagi | |
| 2010/0163653 | A1 | 7/2010 | Pucciani | |
| 2011/0024528 | A1 * | 2/2011 | Pucciani | B05B 1/005 239/597 |
| 2011/0048557 | A1 | 3/2011 | Pucciani | |
| 2012/0247512 | A1 * | 10/2012 | Wu | B08B 1/04 137/15.01 |
| 2012/0315123 | A1 | 12/2012 | Pucciani | |
| 2014/0000220 | A1 * | 1/2014 | Zardini | B67B 1/03 53/167 |
| 2014/0082865 | A1 * | 3/2014 | Takayanagi | B08B 6/00 15/1.51 |
| 2014/0199935 | A1 | 7/2014 | Pucciani | |
| 2014/0338535 | A1 | 11/2014 | Pucciani | |
| 2016/0194161 | A1 | 7/2016 | Pucciani | |

FOREIGN PATENT DOCUMENTS

| | | | |
|---|---|---|---|
| CN | 105483878 | | 4/2016 |
| CN | 106733924 | | 5/2017 |
| CN | 206689143 | | 12/2017 |
| DE | 4335106 | | 4/1994 |
| EP | 2174726 | | 4/2010 |
| FR | 2779668 | | 12/1999 |
| JP | H05226011 | | 9/1993 |
| JP | H10309553 | | 11/1998 |
| JP | 2002231495 | | 8/2002 |
| JP | 2002305096 | | 10/2002 |
| JP | 2003203745 | A * | 7/2003 |
| JP | 2006236763 | | 9/2006 |
| JP | 2008256868 | | 10/2008 |
| JP | 2010088751 | | 4/2010 |
| WO | 2010123579 | | 10/2010 |

OTHER PUBLICATIONS

Int'l Search Report and Written Opinion Appln No. PCT/US2019/035566 dated Oct. 8, 2019.

European Office Communication Appin No. 19733609.2 dated Apr. 11, 2023.

* cited by examiner

AIR RINSING APPARATUS AND SYSTEMS FOR RINSING CONTAINERS

RELATED APPLICATIONS

This patent claims priority to U.S. Provisional Patent Application No. 62/680,796, filed Jun. 5, 2018, entitled "Air Rinsing Apparatus and Systems for Rinsing Containers." The entirety of U.S. Provisional Patent Application No. 62/680,796 is incorporated herein by reference.

BACKGROUND

This disclosure is directed to container rinsing systems and, more particularly, to air rinsing apparatus and systems for rinsing containers.

In food packaging and other types of packaging plants, containers or packaging may require cleaning prior to having food items or other products introduced to the packaging. Conventional packaging cleaning systems required inversion of the packaging to enable removal of any particulate matter from the packaging via gravity.

SUMMARY

Methods and systems are provided for providing a consistent electrode state for welding, substantially as illustrated by and described in connection with at least one of the figures, as set forth more completely in the claims.

Limitations and disadvantages of conventional approaches to providing terminal inputs and outputs for industrial devices will become apparent to one of skill in the art, through comparison of such approaches with some aspects of the present apparatus and system set forth in the remainder of this disclosure with reference to the drawings.

BRIEF DESCRIPTION OF THE DRAWINGS

The figures are not necessarily to scale. Where appropriate, similar or identical reference numbers are used to refer to similar or identical components.

DETAILED DESCRIPTION

Figure 1:
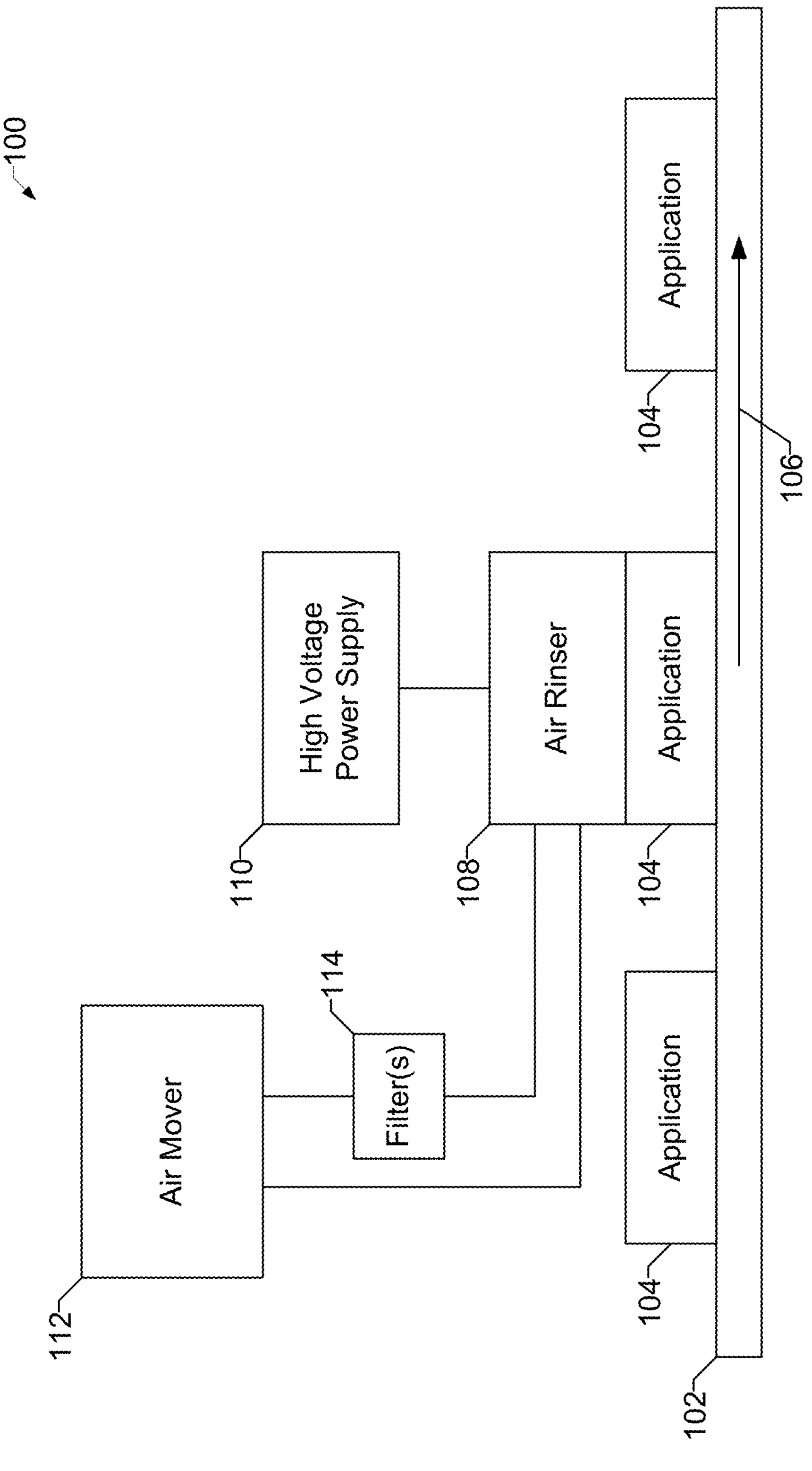
FIG. 1 illustrates an example container rinsing system, in accordance with aspects of this disclosure.

Disclosed example air rinsing apparatus and container rinsing systems provide improved elimination of particulate matter from packaging such as containers, while being capable of elimination of the particulate matter in any orientation of the packaging, including orientations in which an opening of the packaging is facing upwards. Disclosed example air rinsing apparatus may be used with a single air mover to provide both blowing of air (or other gas) into the container and suction for removal of the air and particulate matter from the container.

Disclosed example air rinsing apparatus include: a first enclosure having a first inlet port and a first output port; a second enclosure within the first enclosure, the second enclosure comprising a second inlet port and a second output port, the second output port disposed on a same face of the first enclosure as the first inlet port; and one or more air movers. The air movers are configured to: urge first air into the second inlet port, the second enclosure configured to direct the first air from the second inlet port to the second output port; and pull second air from the first output port, the first enclosure configured to direct the second air from the first inlet port to the first output port.

In some example air rinsing apparatus, the first enclosure includes a plurality of first inlet ports including the first inlet port, and the second enclosure includes a plurality of second output ports including the second output port and equal to the number of first inlet ports, in which the first enclosure is configured to direct the second air from the plurality of first inlet ports to the first output port, and the second enclosure is configured to direct the first air from the second inlet port to the plurality of second output ports. In some examples, the plurality of second output ports include corresponding nozzles that extend through respective ones of the plurality of first inlet ports. In some examples, the plurality of first inlet ports and the plurality of second output ports are arranged in a single row. In some examples, the plurality of first inlet ports and the plurality of second output ports are arranged in two rows.

In some example air rinsing apparatus, the first inlet port includes a frustum-shaped opening configured to accelerate the second air entering the first inlet port. In some examples, the second output port includes a nozzle extending through a smaller base of the frustum-shaped opening of the first inlet port. In some examples, the first enclosure includes a first face, in which the first inlet port and the second output port are on the first face, and the air rinsing apparatus further includes an extension plate positioned co-planar with the first face. In some examples, the second output port includes an air knife.

Some example air rinsing apparatus further include an ionizer disposed within the second enclosure and configured to generate positive and negative ions, in which the second enclosure is configured to direct the first air from the second inlet port to the second output port such that the first air entrains the positive and negative ions. In some examples, the one or more air movers are configured to urge the first air by providing positive air pressure to the second inlet port. In some examples, the one or more air movers are configured to pull the second air by providing negative air pressure to the first output port.

Disclosed example container rinsing systems include a feed line and an air rinsing apparatus. The feed line is configured to direct containers having openings in a first number of rows of containers transverse to a direction of travel of the containers. The air rinsing apparatus is disposed adjacent the feed line, and includes: a first enclosure having a number of first inlet ports equal to the first number of rows of the containers, and a first output port; a second enclosure within the first enclosure, the second enclosure comprising a second inlet port and a number of second output ports equal to the first number of rows of the containers, the second output ports disposed on a same face of the first enclosure as the first inlet ports; and one or more air movers configured to: urge first air into the second inlet port, the second enclosure configured to direct the first air from the second inlet port to the second output ports and into the containers; and pull second air via the first output port, the first enclosure configured to direct the second air from the first inlet ports to the first output port to pull air and particulates from the containers.

In some example container rinsing systems, the number of second output ports is equal to the number of first inlet ports, the first enclosure is configured to direct the second air from the first inlet ports to the first output port, and the second enclosure is configured to direct the first air from the second inlet port to the second output ports. In some examples, the second output ports include corresponding nozzles that extend through respective ones of the first inlet ports. In some examples, the first inlet ports and the second output ports are arranged in a single row. In some examples, the first inlet ports and the second output ports are arranged in two rows.

In some example container rinsing systems, each of the first inlet ports includes a frustum-shaped opening configured to accelerate the second air entering the first inlet port. In some example container rinsing systems, each of the second output ports includes a nozzle extending through a smaller base of the frustum-shaped opening of a respective one of the first inlet ports. In some examples, the first enclosure comprises a first face, the first inlet ports and the second output ports being on the first face, and the air rinsing apparatus further comprising an extension plate positioned co-planar with the first face.

FIG. 1 is a block diagram of an example container rinsing system 100. The system 100 includes a conveyor or feed line 102 which conveys applications 104 of the system 100 in a direction of travel 106. Example applications 104 include containers having a single opening (e.g., cans, cups, boxes, etc.) and/or any other type of packaging. The applications 104 may be conveyed multiple feed lines positioned transverse to the direction of travel 106. The examples described below with reference to FIGS. 2-6 are configured to remove particulate matter from four parallel feed lines, though any number of parallel feed lines may be used.

The system 100 includes an air rinser 108 positioned adjacent a path of travel of the applications 104 as the applications 104 are moved along the feed line 102. The air rinser 108 blows air into the applications 104 while simultaneously providing suction adjacent the application 104. The suction removes particulate matter from the applications 104, which is loosened from the interior surfaces of the applications 104 and entrained within the air stream created in the applications 104 by the blown air from the air rinser 108.

In some examples, the air rinser 108 generates and directs positive and negative ions at the applications 104 via the blown air. To this end, the example system 100 may include a high voltage power supply 110 electrically coupled to the air rinser 108 to enable generation of positive and negative ions, as described in more detail below.

An air mover 112 provides positive air pressure to the air rinser 108 for blowing the air at the applications 104 and provides negative air pressure to the air rinser 108 for removing the air containing particulate matter from the applications 104. By using a single air mover 112, the complexity and maintenance costs of the system 100 are reduced. Additionally, using the single air mover 112 enables the flow rates of the air blown at the applications 104 and the air removed from the applications 104 to be consistently equal. One or more filters 114 are provided between the air rinser 108 and the negative pressure source in the air mover 112 to filter the particulate matter removed from the applications 104.

In other examples, a first air mover may be used to provide the positive pressure to the air rinser 108 and a second air mover may be used to provide the negative pressure to the air rinser 108.

Figure 2:
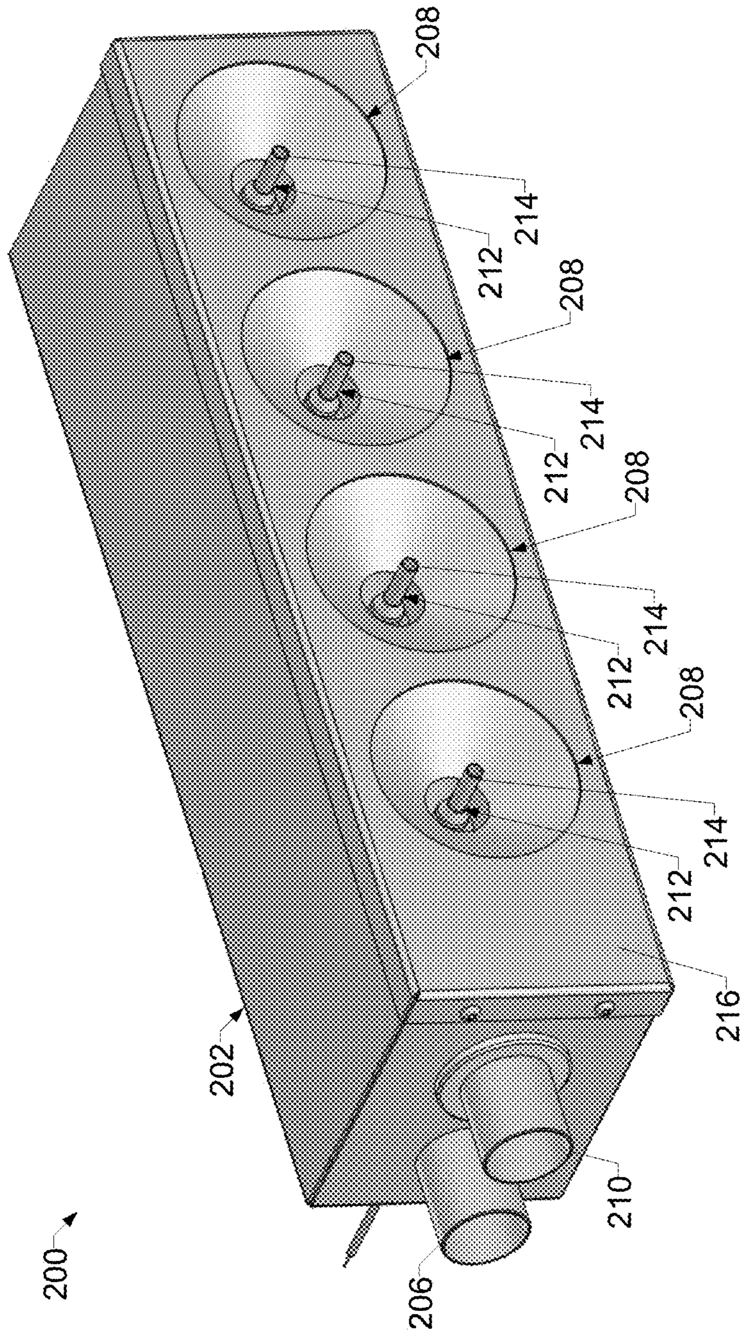
FIG. 2 is a perspective view of an example air rinser that may be used to implement the air rinser of FIG. 1.
Figure 3:
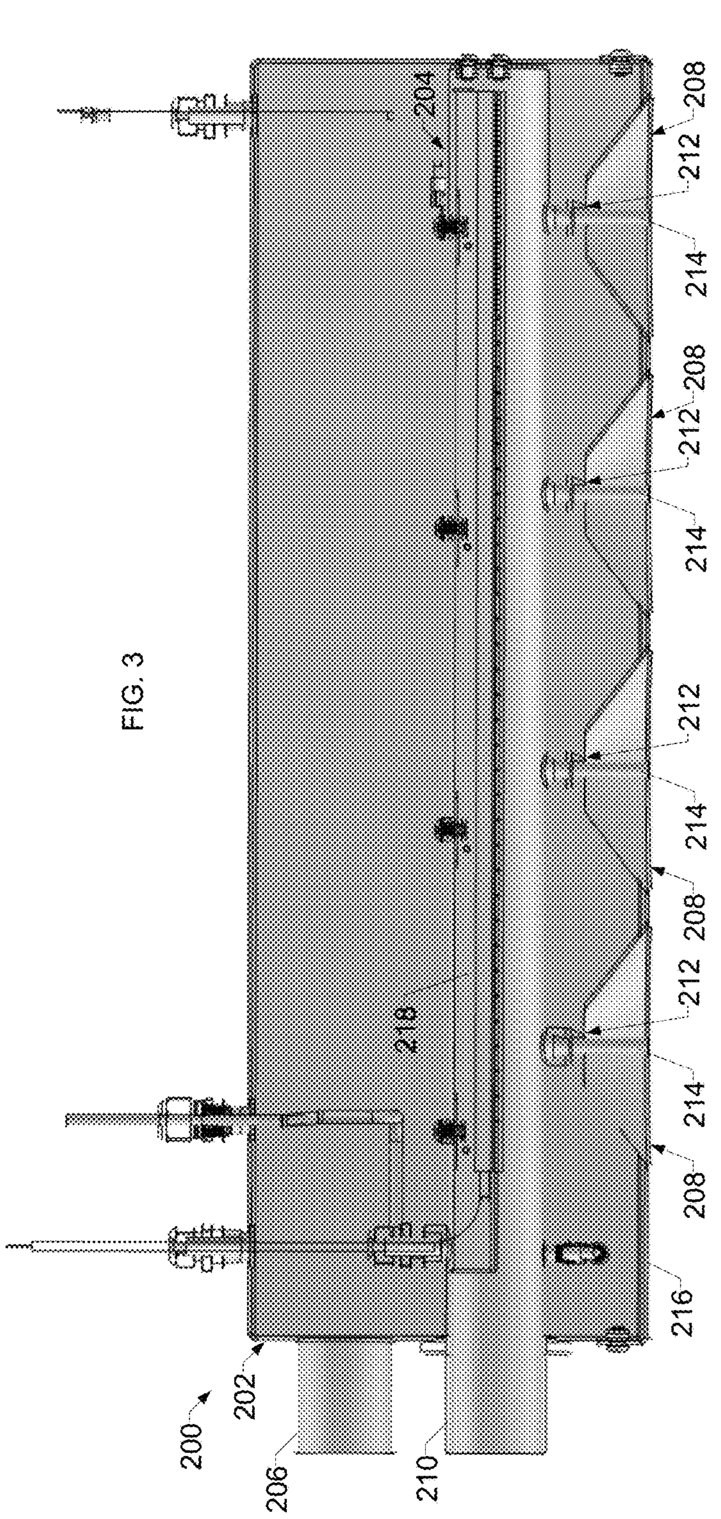
FIG. 3 is a section elevation view of the example air rinser of FIG. 2.
Figure 4:
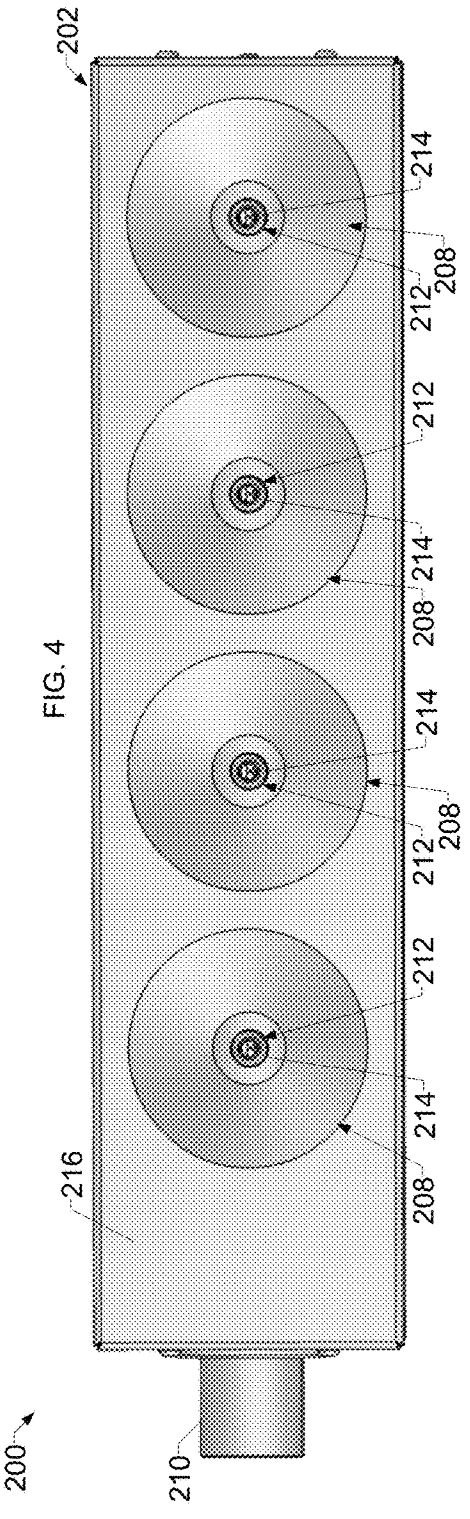
FIG. 4 is a bottom plan view of the example air rinser of FIG. 2.
Figure 5:
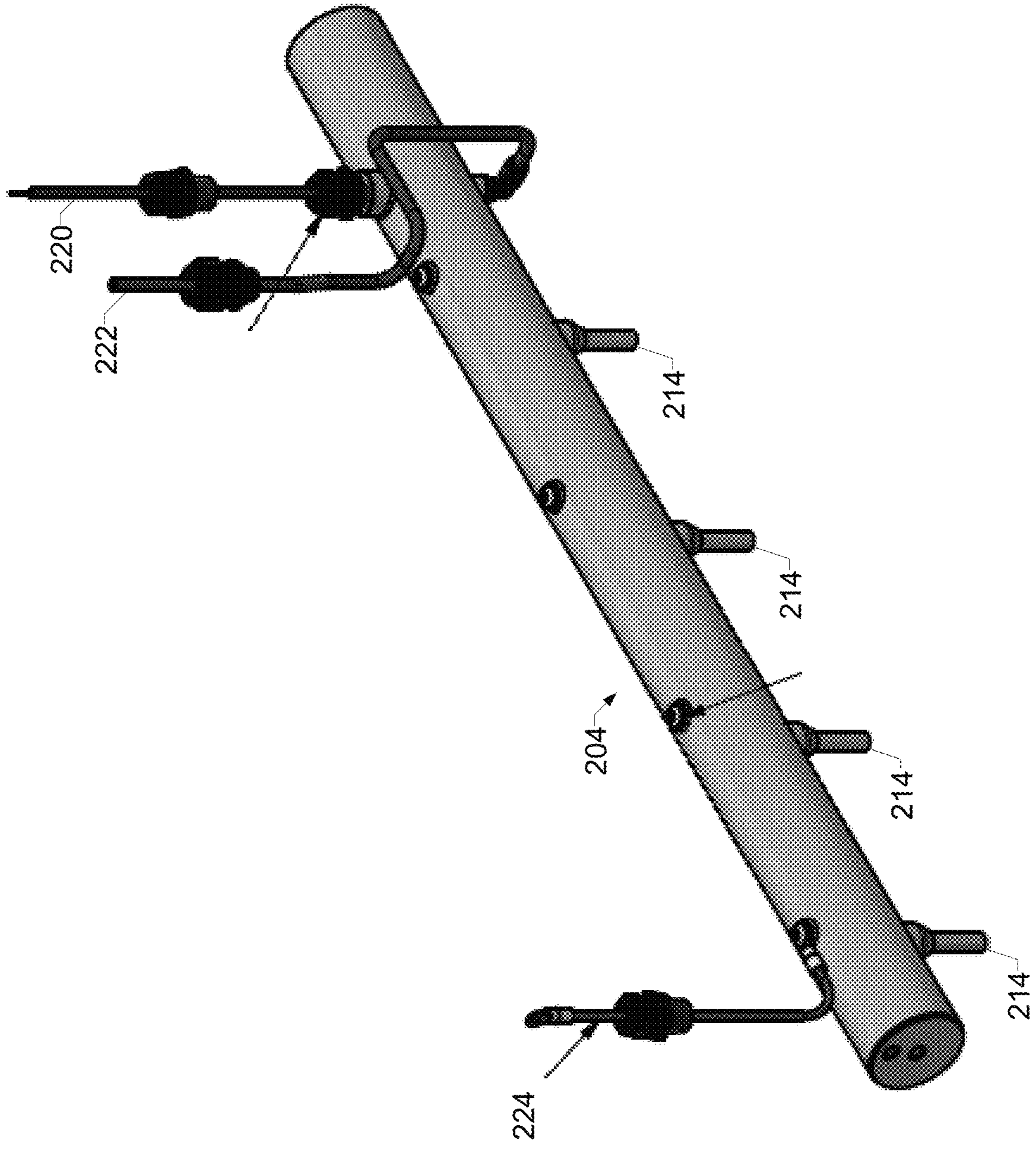
FIG. 5 is a perspective view of the example second enclosure of FIG. 3.

FIG. 2 is a perspective view of an example air rinser 200 that may be used to implement the air rinser 108 of FIG. 1. FIG. 3 is a section elevation view of the example air rinser 200 and FIG. 4 is a bottom plan view of the example air rinser 200. The air rinser 200 includes a first enclosure 202, within which a second enclosure 204 is mounted. FIG. 5 is a perspective view of the example second enclosure 204.

The first enclosure 202 is connected to a negative air pressure source (e.g., the air mover 112 of FIG. 1) via a first output port 206 (e.g., a particulate output port). Due to the negative air pressure, the first enclosure 202 draws in air (and particulate matter entrained in the air) via first inlet ports 208. The example inlet ports 208 are numbered based on a number of parallel feed lines conveying the application to be rinsed via the air rinser 200 (e.g., four). In the illustrated example, the first inlet ports 208 have a conical frustum shape, in which air is drawn from the larger base to the smaller base of the conical frustum. The frustum shape of the first inlet ports 208 results in an increasing air speed as the air flow approaches the interior of the first enclosure 202. The larger base of the frustum may be matched to the opening of the applications 104 (e.g., an opening of the container) to improve particulate collection from the applications 104. Compared with a simple opening, the frustum shape also reduces the surface area from which particulate matter can fall back out of the first enclosure 202. However, the first inlet ports 208 may have other shapes, such as a simple opening.

The example second enclosure 204 is connected to a positive air pressure source (e.g., the air mover 112 of FIG. 1) via a second inlet port 210 and outputs air via second output ports 212. For example, the second enclosure 204 may be a manifold that receives the positive air pressure via the second inlet port 210 and distributes the received air via the second output ports 212.

The second output ports 212 include nozzles 214 that protrude at least partially through respective ones of the first inlet ports 208. Accordingly, the first inlet ports 208 and the second output ports 212 are disposed on a same face 216 of the first enclosure 202. For example, as illustrated in FIGS. 2 and 3, the nozzles 214 extend from the interior of the first enclosure 202 through the smaller base of the frustum but do not extend beyond the larger base of the frustum or the face 216 of the first enclosure 202.

The example second enclosure 204 of FIG. 3 further includes an ionizer 218. The ionizer 218 is coupled to the high voltage power supply 110 of FIG. 1. In operation, the ionizer 218 generates positive and negative ions. The ions move into the air stream moving from the second inlet port 210 to the second output ports 212, where the ions are blown at the applications 104. The ions may neutralize any static charge present on the particulate matter and/or on the applications 104 which may cause the particulate matter to stick to the applications 104 instead of being removed by the airflow. The ionizer 118 may be implemented using a corona wire, individual ion emitters, and/or any other method.

As shown in FIG. 5, the ionizer 218 may be provide with high voltage via a high voltage wire 220, a reference voltage via a reference voltage wire 222, and/or a ground reference by a ground wire 224. The wires 220-224 extend through the first enclosure 202. Wire plugs 226 provide an air seal to the first enclosure 202 at the locations where the wires 220-224 penetrate the first enclosure 202.

While the example second enclosure 204 of FIGS. 2-5 include discrete output ports 212, in other examples the output ports 212 may be replaced by an air knife. In such examples, the first inlet ports 208 may also be replaced by a single first inlet port configured to provide suction in the same manner as the first inlet ports 208. For example, the single first inlet port may taper into the first enclosure 202 to provide similar benefits as the frustum shape of the first inlet ports 208.

While the example air rinser 200 of FIG. 2 includes a single row of first inlet ports 208 and second output ports 212, in other examples a second row of inlet ports and output ports, identical to the first inlet ports 208 and second output ports 212, may be included. The second row of inlet ports and output ports may further improve the rinsing and collection of particulates from the applications 104.

Figure 6:
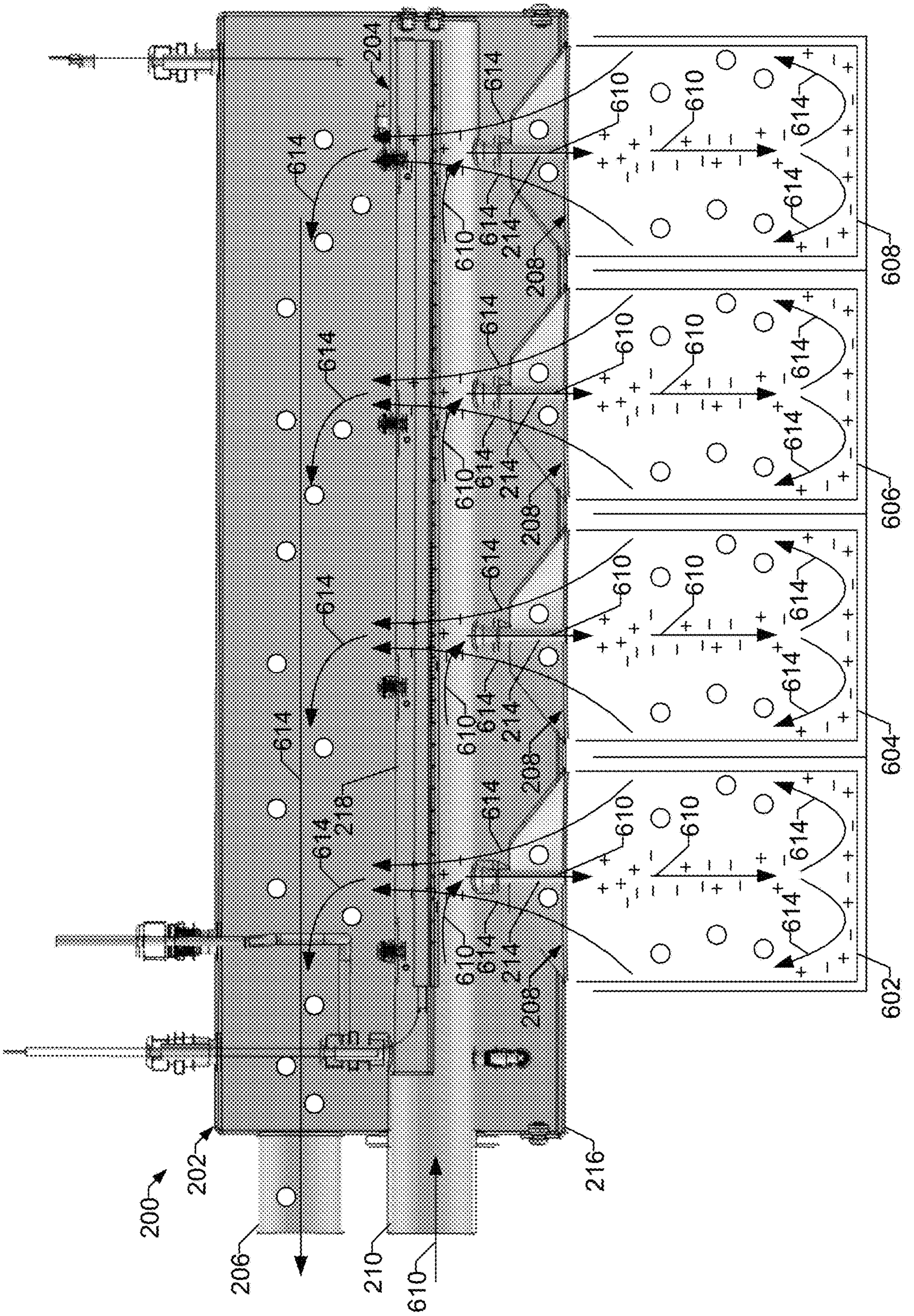
FIG. 6 illustrates an example of operation of the example air rinser of FIG. 3.

FIG. 6 illustrates an example of operation of the example air rinser 200 of FIGS. 2-5. The air rinser 200 is illustrated in FIG. 6 adjacent four upright containers 602, 604, 606, 608, which are conveyed on parallel feed lines 102 of FIG. 1. The example air rinser 200 may be run continually, while the containers 602-608 are moved into and out of fluid communication with the air rinser 200. As illustrated in FIG. 6, the clearance distance between the top of the applications 104 (e.g., the containers 602-608) may be limited to improve the fluid coupling between the second output ports 212, the first inlet ports 208, and the containers 602-608, thereby improving the proportion of particulate that is captured by the air rinser 200 and reducing the amount of particulate that may be spilled into the environment surrounding the air rinser 200 and/or the system 100.

A first airflow 610 is generated by positive pressure from the air mover 112 of FIG. 1, and enters the second enclosure 204 via the second inlet port 210. The first airflow 610 entrains positive and negative ions generated by the ionizer 218 (represented by + symbols and − symbols in FIG. 6) and exits the nozzles 214 into the containers 602-608 with the ions. The example first airflow 610 exits the nozzles 214 with sufficient velocity to reach the opposite ends of the containers 602-608 and/or to create substantial turbulence within the containers 602-608 such that particulate matter 612 within the containers 602-608 is loosened from the containers 602-608.

A second airflow 614 is generated by negative pressure from the air mover 112 via the first output port 206. The second airflow 614 contains substantially the same air as the first airflow 610, and has entrained loosened particulate matter 612. The second airflow 614 flows from the containers 602-608 and through the first inlet ports 208 into the first enclosure 202. From the first enclosure 202, the negative pressure causes the second airflow 614 to flow from the first enclosure 202 through the first output port 206 to the air mover 112.

Figure 7:
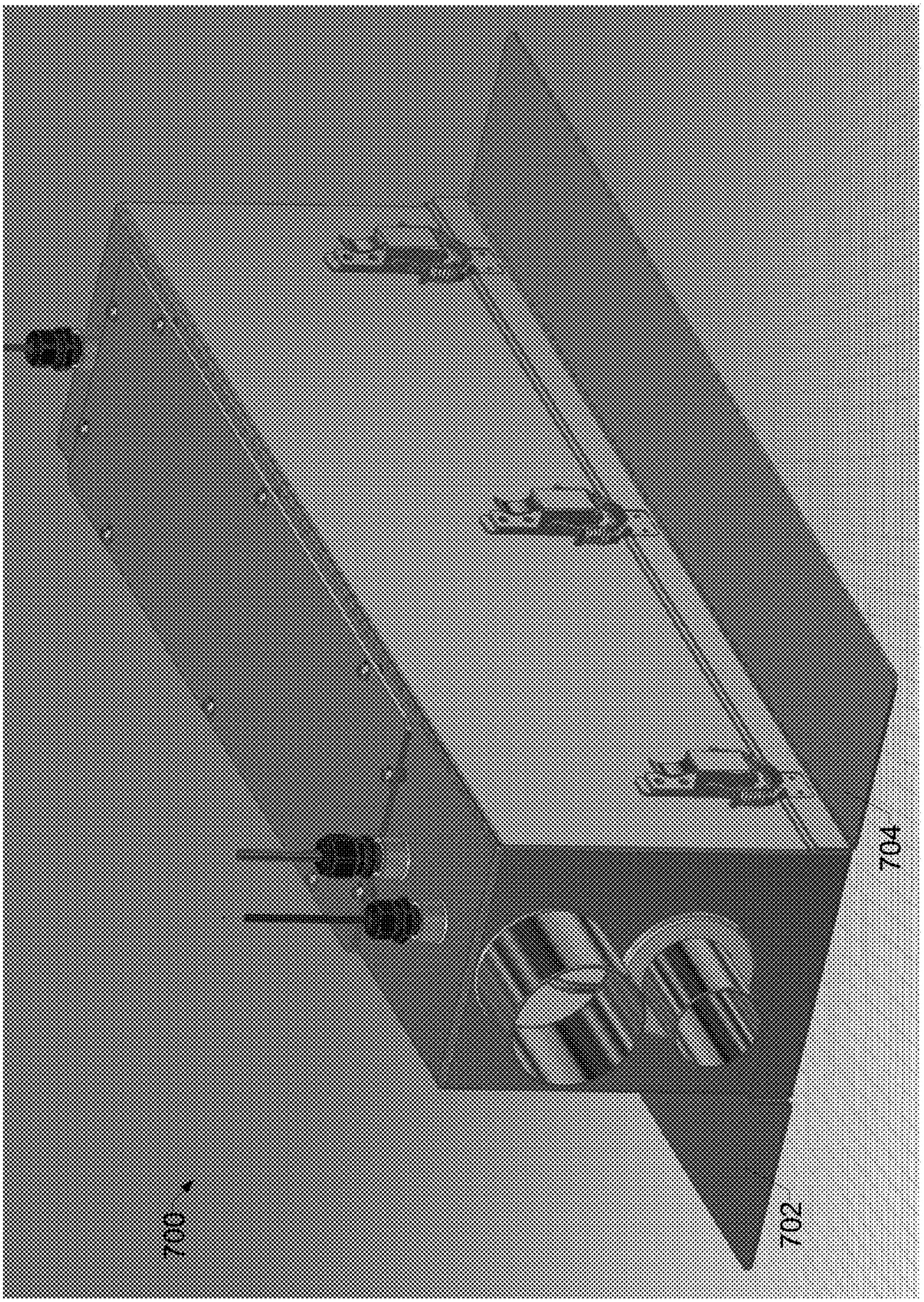
FIG. 7 illustrates the example air rinser of FIG. 2 including extension plates.

FIG. 7 illustrates the example air rinser 200 of FIG. 2 including extension plates 702, 704. The extension plates 702, 704 cover the applications 104 for a distance prior to and/or after the rinsing performed by the air rinser 200. In particular, the extension plates 702, 704 reduce or prevent an air path from forming between the nozzles 214, the applications 104, and an environment outside of the air rinser 200. For example, when the application 104 first comes into fluid communication with the nozzle 214, the airflow (and particulates) may escape from being suctioned into the first enclosure 202 by the nozzle 214 being in fluid communication with the external environment by way of the application 104. The extension plates 702, 704 may be integrated, permanently affixed, or detachable using any appropriate attachment technique.

As an alternative to the extension plates 702, 704, the dimensions of the first enclosure 202 may be adjusted to extend the face 216 of the first enclosure 202 to cover a similar area as the extension plates 702, 704.

As utilized herein, "and/or" means any one or more of the items in the list joined by "and/or." As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations.

While the present apparatus and/or system has been described with reference to certain implementations, it will be understood by those skilled in the art that various changes may be made and equivalents may be substituted without departing from the scope of the present apparatus and/or system. In addition, many modifications may be made to adapt a particular situation or material to the teachings of the present disclosure without departing from its scope. Therefore, the present apparatus and/or system are not limited to the particular implementations disclosed. Instead, the present apparatus and/or system will include all implementations falling within the scope of the appended claims, both literally and under the doctrine of equivalents.

What is claimed is:

1. An air rinsing apparatus, comprising:

a first enclosure having a plurality of first inlet ports and a first output port;

a second enclosure extending in a first direction within the first enclosure, the second enclosure comprising a second inlet port and a plurality of second output ports, the second output ports disposed on a same face of the first enclosure as the first inlet ports, wherein the second output ports include corresponding nozzles that extend through respective ones of the plurality of first inlet ports, wherein the plurality of first inlet ports and the plurality of second output ports are aligned in the first direction;

one or more air movers configured to:

urge first air into the second inlet port, the second enclosure configured to direct the first air from the second inlet port to the second output ports; and pull second air from the first output port, the first enclosure configured to direct the second air from the first inlet ports to the first output port; and an ionizer disposed within the second enclosure, the ionizer comprising a high voltage wire, a ground wire, and a reference wire each extending in the first direction along a length of the second enclosure adjacent the second output ports, and the ionizer configured to generate positive and negative ions, the second enclosure configured to direct the first air from the second inlet port to the second output ports such that the first air entrains the positive and negative ions.

2. The air rinsing apparatus as defined in claim 1, wherein the plurality of first inlet ports and the plurality of second output ports are arranged in a single row.

3. The air rinsing apparatus as defined in claim 1, wherein the plurality of first inlet ports and the plurality of second output ports are arranged in two rows.

4. The air rinsing apparatus as defined in claim 1, wherein the first inlet ports comprise frustum-shaped openings configured to accelerate the second air entering the first inlet ports.

5. The air rinsing apparatus as defined in claim 4, wherein the nozzles extend through a smaller base of the frustum-shaped opening of the first inlet port.

6. The air rinsing apparatus as defined in claim 5, wherein the smaller base of the frustum-shaped opening of each of the first inlet ports opens into a same cavity within the first enclosure.

7. The air rinsing apparatus as defined in claim 1, wherein the first enclosure comprises a first face, the first inlet ports and the second output ports being on the first face, and the air rinsing apparatus further comprising an extension plate positioned co-planar with the first face.

8. The air rinsing apparatus as defined in claim 1, wherein the second output ports comprise an air knife.

9. The air rinsing apparatus as defined in claim 1, wherein the one or more air movers are configured to urge the first air by providing positive air pressure to the second inlet port.

10. The air rinsing apparatus as defined in claim 1, wherein the one or more air movers are configured to pull the second air by providing negative air pressure to the first output port.

11. A container rinsing system, comprising:

a feed line configured to direct containers having openings, the feed line configured to direct the containers in a first plurality of rows of containers transverse to a direction of travel of the containers;

an air rinsing apparatus disposed adjacent the feed line, the air rinsing apparatus comprising:

a first enclosure having a plurality of first inlet ports equal in number to the first plurality of rows of the containers, and a first output port;

a second enclosure extending in a first direction within the first enclosure, the second enclosure comprising a second inlet port and a plurality of second output ports equal in number to the first plurality of rows of the containers, the second output ports disposed on a same face of the first enclosure as the first inlet ports, wherein the plurality of first inlet ports and the plurality of second output ports are aligned in the first direction; and one or more air movers configured to:

urge first air into the second inlet port, the second enclosure configured to direct the first air from the second inlet port to the second output ports and into the containers; and pull second air via the first output port, the first enclosure configured to direct the second air from the first inlet ports to the first output port to pull air and particulates from the containers; and an ionizer disposed within the second enclosure, the ionizer comprising a high voltage wire, a ground wire, and a reference wire each extending in the first direction along a length of the second enclosure adjacent the second output ports, and the ionizer configured to generate positive and negative ions, the second enclosure configured to direct the first air from the second inlet port to the second output ports such that the first air entrains the positive and negative ions.

12. The container rinsing system as defined in claim 11, wherein the second output ports include corresponding nozzles that extend through respective ones of the first inlet ports.

13. The container rinsing system as defined in claim 12, wherein the first inlet ports and the second output ports are arranged in a single row.

14. The container rinsing system as defined in claim 12, wherein the first inlet ports and the second output ports are arranged in two rows.

15. The container rinsing system as defined in claim 11, wherein each of the first inlet ports comprises a frustum-shaped opening configured to accelerate the second air entering the first inlet port.

16. The container rinsing system as defined in claim 15, wherein each of the second output ports comprises a nozzle extending through a smaller base of the frustum-shaped opening of a respective one of the first inlet ports.

17. The container rinsing system as defined in claim 11, wherein the first enclosure comprises a first face, the first inlet ports and the second output ports being on the first face, and the air rinsing apparatus further comprising an extension plate positioned co-planar with the first face.

* * * * *